(12) United States Patent
Meier (10) Patent No.: US 9,472,079 B2
(45) Date of Patent: Oct. 18, 2016

(54) METHOD AND SYSTEM TO ENABLE SELECTIVE SMOKE DETECTION SENSITIVITY

(71) Applicant: The Boeing Company, Chicago, IL (US)

(72) Inventor: Oliver C. Meier, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 56 days.

(21) Appl. No.: 14/512,447

(22) Filed: Oct. 12, 2014

(65) Prior Publication Data

US 2016/0104358 A1    Apr. 14, 2016

(51) Int. Cl.
    *G08B 23/00* (2006.01)
    *G08B 17/10* (2006.01)

(52) U.S. Cl.
    CPC ..................... *G08B 17/10* (2013.01)

(58) Field of Classification Search
None
See application file for complete search history.

(56) References Cited

U.S. PATENT DOCUMENTS

| 4,792,797 A | 12/1988 | Tanguay et al. | |
|---|---|---|---|
| 2001/0020899 A1* | 9/2001 | Kadwell | G08B 17/107 340/630 |
| 2010/0033319 A1* | 2/2010 | Pattok | G08B 17/00 340/538 |
| 2014/0058806 A1* | 2/2014 | Guenette | G06Q 10/20 705/14.1 |
| 2015/0100167 A1* | 4/2015 | Sloo | G01N 27/02 700/278 |
| 2015/0279134 A1* | 10/2015 | Warren | G07C 9/00039 340/5.85 |

OTHER PUBLICATIONS

Canadian Intellectual Property Office (CIPO) Examination Search Report, Issued Aug. 17, 2016, for counterpart Canadian Patent Application No. 2,898,543, Owner The Boeing Company, 4 pages.

* cited by examiner

*Primary Examiner* — Ojiako Nwugo (57) ABSTRACT

There is provided a method to enable selective smoke detection sensitivity onboard an aircraft. The method has the step of installing one or more sensitivity selectable smoke detector assemblies. The method further has the step of electrically or wirelessly coupling the one or more sensitivity selectable smoke detector assemblies installed onboard the aircraft to one or more sensitivity selector controls installed onboard the aircraft. The method further has the step of selecting an alarm setpoint sensitivity level from two or more alarm setpoint sensitivity levels for each of the one or more sensitivity selectable smoke detector assemblies, based on sensitivity level determination factors of one or more of a mission type of the aircraft, a cargo type on the aircraft, a compartment zone specific area type on the aircraft, and an occupancy state on the aircraft.

20 Claims, 9 Drawing Sheets

SENSITIVITY LEVEL DETERMINATION FACTORS 130

- MISSION TYPE 130a
- CARGO TYPE 130b
- COMPARTMENT ZONE SPECIFIC AREA TYPE 130c
- OCCUPANCY STATE 130d
- SMOKE DENSITY LEVEL 130e
- MOISTURE CONTENT 130f
- TEMPERATURE 130g
- TYPE OF GAS PRESENT 130h
- CONCENTRATION OF GAS PRESENT 130i
- AIRCRAFT ENGINE OPERATING STATUS 130j
- AIR SPEED 130k
- ALTITUDE 130l
- AIRCRAFT DOOR OPEN OR DOOR CLOSED STATUS 130m
- AIRCRAFT SYSTEM STATUS 130n
- ENVIRONMENTAL CONTROL SYSTEM SETTING 130o
- ENVIRONMENTAL CONTROL SYSTEM CONFIGURATION 130p
- AIRCRAFT AIR CONDITIONING SYSTEM ON OR OFF STATUS 130q
- CARGO AREA AIR CONDITIONING SYSTEM ON OR OFF STATUS 130r
- AIRCRAFT CONFIGURATION STATUS 130s

FIG. 8B

METHOD AND SYSTEM TO ENABLE SELECTIVE SMOKE DETECTION SENSITIVITY

BACKGROUND

1) Field of the Disclosure

The disclosure relates generally to smoke detection systems and methods, and more particularly, to selective smoke detection sensitivity systems and methods for air vehicles, such as commercial passenger aircraft and cargo aircraft.

2) Description of Related Art

Known methods and systems exist for smoke detection on air vehicles, such as commercial passenger aircraft and cargo aircraft. With such known smoke detection methods and systems, when smoke in an area of an aircraft becomes sufficiently dense, it will typically trigger the smoke detection system and cause an alarm in the flight deck signaling the presence of a fire. Smoke detection system sensitivity is a key factor in how long it takes to detect smoke/fire. The faster smoke or fire is detected, the faster a flight crew can initiate fire suppression systems and divert the air vehicle to an airport.

However, known smoke detection methods and systems may typically have only one alarm setpoint. This alarm setpoint may be based on laboratory and flight testing and may be set as high (least sensitive) as possible to create a false alarm tolerant system. This false alarm tolerant system assumes certain types of cargo (e.g., fresh flowers, fish) may accidentally trigger a false alarm, if fog from moisture, dust, or other false alarm nuisances, are present.

In some cases, operators may prefer to have a more sensitive system and trade off the "lower sensitivity" detector, if false alarm nuisance causing cargo is not being carried. For example, when carrying batteries, such as lithium batteries, as cargo, the likelihood of a false alarm may be low, while the desire for an early detection may be high. In many cases, inert cargo, such as packages, machinery, batteries, and the like, may be carried but may pose a low risk of causing a false alarm. In these cases, smoke detection methods and systems may be unnecessarily "desensitized" for false alarm immunity. In addition, with known smoke detection methods and systems, it may be difficult, without installing new smoke detectors altogether, for flight crews to change or vary the smoke detector sensitivity in order to increase the smoke detector sensitivity in the aircraft.

Accordingly, there is a need in the art for an improved method and system to enable selective smoke detection sensitivity, that provide advantages over known methods and systems.

SUMMARY

Example implementations of the present disclosure provide an improved method and system to enable selective smoke detection sensitivity. As discussed in the below detailed description, embodiments of the improved method and system to enable selective smoke detection sensitivity, may provide significant advantages over existing systems and methods.

In one embodiment there is provided a method to enable selective smoke detection sensitivity onboard an aircraft. The method comprises the step of installing one or more sensitivity selectable smoke detector assemblies onboard the aircraft.

The method further comprises the step of electrically or wirelessly coupling the one or more sensitivity selectable smoke detector assemblies installed onboard the aircraft to one or more sensitivity selector controls installed onboard the aircraft. The method further comprises the step of selecting an alarm setpoint sensitivity level from two or more alarm setpoint sensitivity levels for each of the one or more sensitivity selectable smoke detector assemblies, based on sensitivity level determination factors comprising one or more of a mission type of the aircraft, a cargo type on the aircraft, a compartment zone specific area type on the aircraft, and an occupancy state on the aircraft.

In another embodiment there is provided a method to enable selective smoke detection sensitivity onboard an aircraft. The method comprises the step of installing one or more sensitivity selectable smoke detector assemblies onboard the aircraft. The method further comprises the step of using the one or more sensitivity selectable smoke detector assemblies onboard the aircraft to autonomously vary in real time its alarm setpoint sensitivity level, selected from two or more alarm setpoint sensitivity levels, based on sensitivity level determination factors comprising one or more of an aircraft system status and an aircraft configuration status.

In another embodiment there is provided a system to enable selective smoke detection sensitivity onboard an aircraft. The system comprises one or more sensitivity selectable smoke detector assemblies installed onboard the aircraft.

Each sensitivity selectable smoke detector assembly comprises a sensitivity selectable smoke detector device; one or more sensors electrically or wirelessly coupled to the sensitivity selectable smoke detector device; and a controller coupled to the sensitivity selectable smoke detector device. Each sensitivity selectable smoke detector further comprises a system logic coupled to the sensitivity selectable smoke detector device or to the controller. The system logic is configured to autonomously vary in real time two or more alarm setpoint sensitivity levels, based on sensitivity level determination factors comprising one or more of an aircraft system status and an aircraft configuration status.

Each sensitivity selectable smoke detector further comprises one or more system inputs measured by the one or more sensors and input into each sensitivity selectable smoke detector device, or input into the controller, for processing by the system logic. Each sensitivity selectable smoke detector further comprises a system output generated when the alarm setpoint sensitivity level is triggered.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
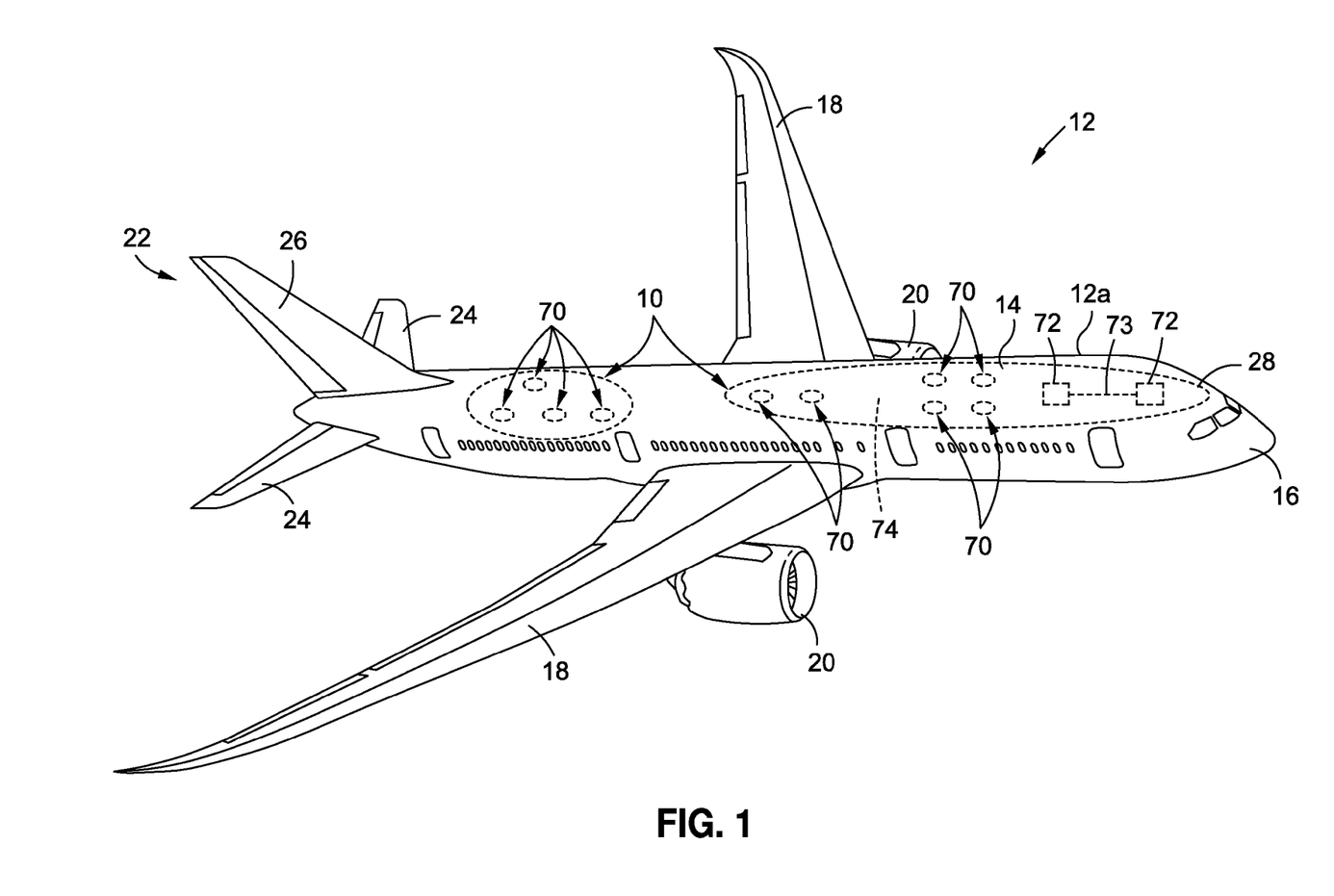
FIG. 1 is an illustration of a perspective view of an air vehicle that may incorporate one or more embodiments of a system and a method of the disclosure.

Now referring to the Figures, FIG. 1 is an illustration of a perspective view of an air vehicle 12, such as in the form of an aircraft 12a, that may incorporate one or more embodiments of a system 10 (see FIGS. 4A-4B, 8), a method 200 (see FIG. 6), or a method 300 (see FIG. 7) of the disclosure to enable selective smoke detection sensitivity onboard the air vehicle 12, such as in the form of aircraft 12a.

As further shown in FIG. 1, the air vehicle 12, such as in the form of aircraft 12a, comprises a fuselage 14, a nose 16, wings 18, engines 20, an empennage 22 comprising horizontal stabilizers 24 and a vertical stabilizer 26, and a cockpit 28. As further shown in FIG. 1, the aircraft 12a shows an embodiment of the system 10 with the sensitivity selectable smoke detector assemblies 70, and the sensitivity selector control panels 72 coupled via a coupling element 73, such as wired or wireless coupling elements.

Although the air vehicle 12, such as in the form of aircraft 12a, shown in FIG. 1 is generally representative of a commercial passenger aircraft having one or more embodiments of the system 10, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as vehicles such as trains, trucks, automobiles, watercraft, ships and submarines, and as well as warehouses or other structures suitable for incorporating one or more embodiments of the system 10 of the disclosure.

Figure 2:
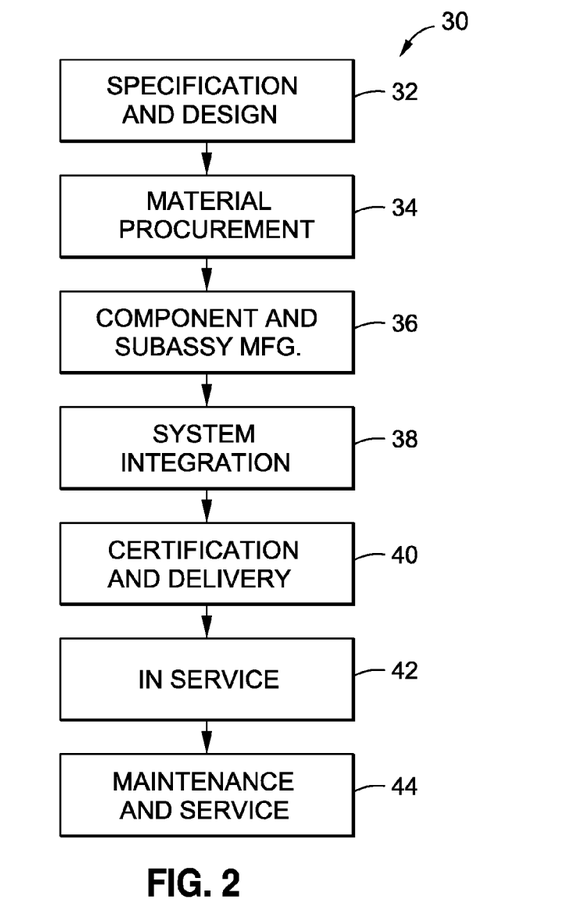
FIG. 2 is an illustration of a flow diagram of an aircraft manufacturing and service method.
Figure 3:
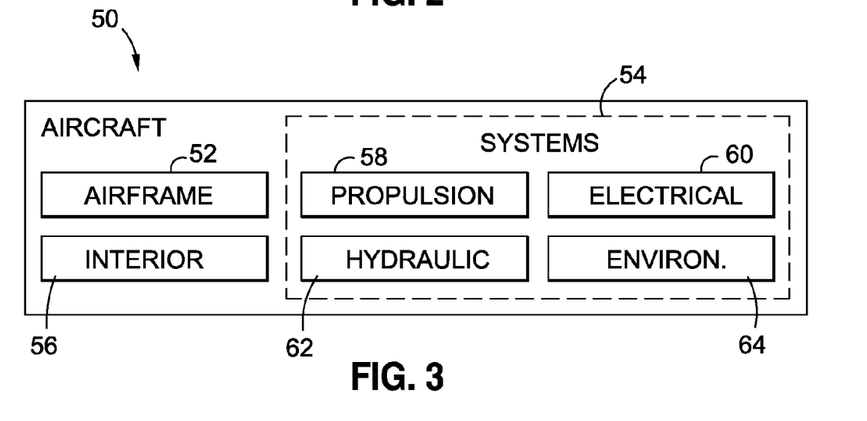
FIG. 3 is an illustration of a block diagram of an aircraft.

FIG. 2 is an illustration of a flow diagram of an aircraft manufacturing and service method 30. FIG. 3 is an illustration of a block diagram of an aircraft 50. Referring to FIGS. 2-3, embodiments of the disclosure may be described in the context of the aircraft manufacturing and service method 30 as shown in FIG. 2 and the aircraft 50 as shown in FIG. 3.

During pre-production, exemplary aircraft manufacturing and service method 30 may include specification and design 32 of the aircraft 50 and material procurement 34. During manufacturing, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 may be scheduled for routine maintenance and service 44 (which may also include modification, reconfiguration, refurbishment, and other suitable services).

Each of the processes of exemplary aircraft manufacturing and service method 30 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and supplier. An operator may include, without limitation, an airline, leasing company, military entity, service organization, and other suitable operators.

As shown in FIG. 3, the aircraft 50 produced by exemplary aircraft manufacturing and service exemplary method 30 may include an airframe 52 with a plurality of systems 54 and an interior 56. Examples of the plurality of systems 54 may include one or more of a propulsion system 58, an electrical system 60, a hydraulic system 62, and an environmental system 64. Any number of other systems may be included. Although an aerospace example is shown, the principles of the disclosure may be applied to other industries, such as the automotive industry, the trucking industry, the watercraft industry such as for ships and submarines, the warehouse industry, and other suitable industries.

Methods and systems embodied herein may be employed during any one or more of the stages of the exemplary aircraft manufacturing and service method 30. For example, components or subassemblies corresponding to component and subassembly manufacturing 36 may be fabricated or manufactured in a manner similar to components or subassemblies produced while the aircraft 50 is in service 42. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of apparatus embodiments, method embodiments, or a combination thereof, may be utilized while the aircraft 50 is in service 42, for example and without limitation, to maintenance and service 44.

Figure 4A:
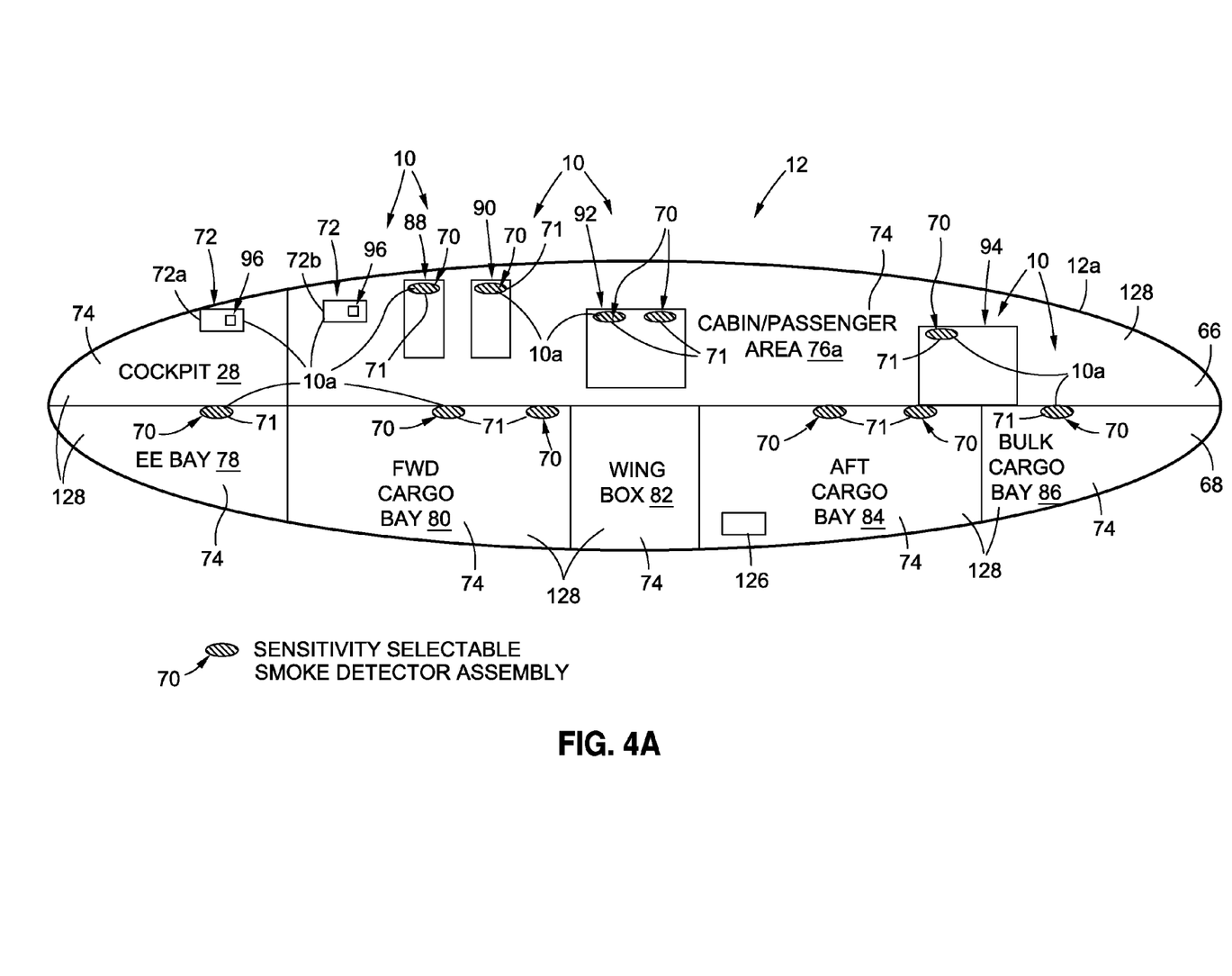
FIG. 4A is an illustration of a schematic diagram showing an embodiment of a system to enable selective smoke detection sensitivity of the disclosure.
Figure 4B:
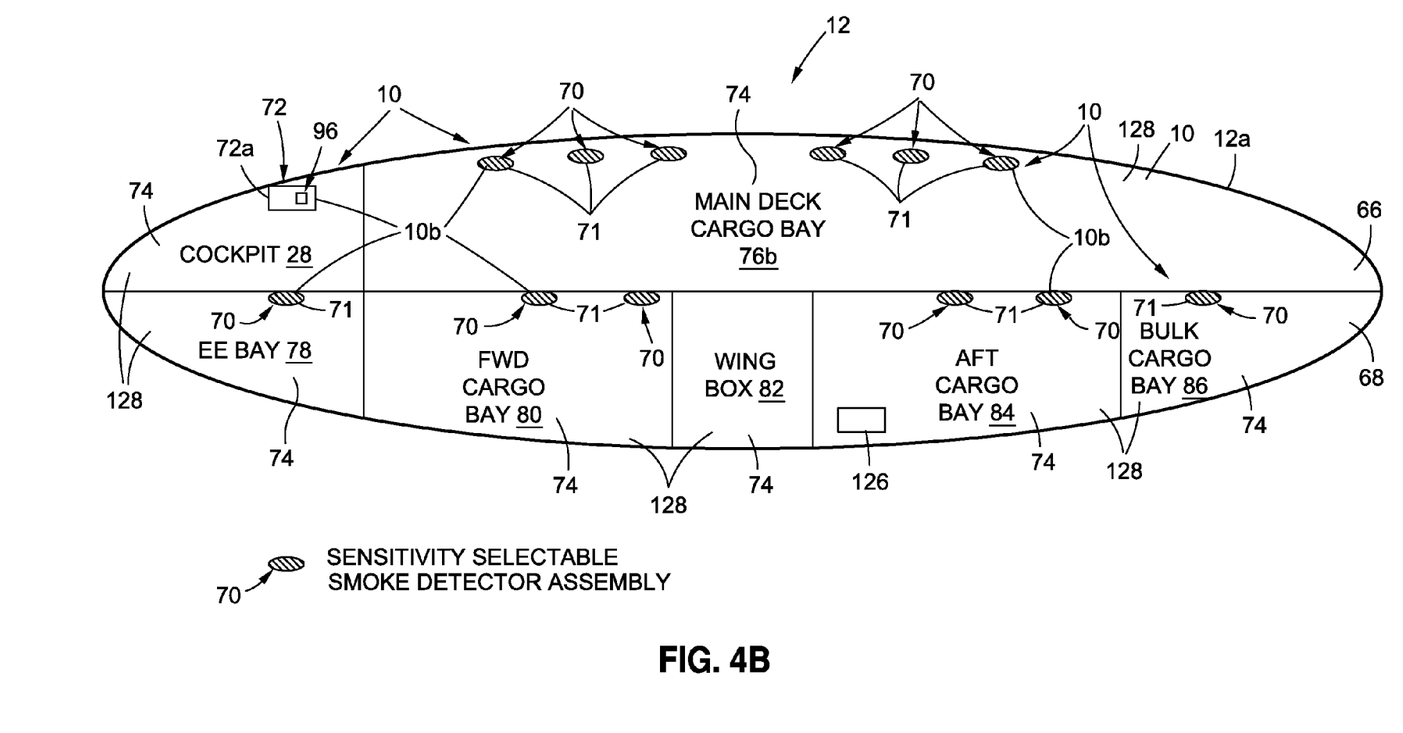
FIG. 4B is an illustration of a schematic diagram showing another embodiment of a system to enable selective smoke detection sensitivity of the disclosure.
Figure 8A:
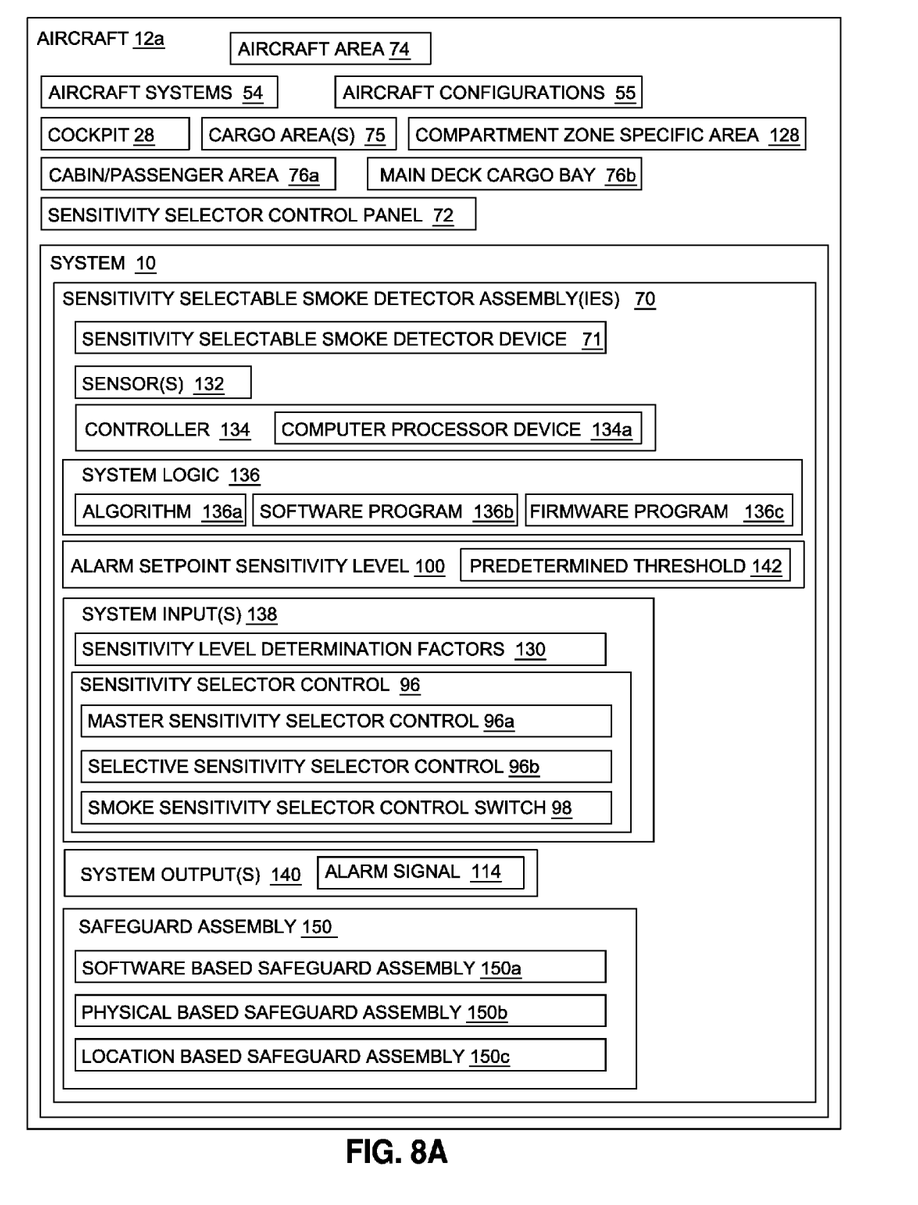
FIG. 8A is an illustration of a functional box diagram showing an embodiment of a system of the disclosure.

In one embodiment of the disclosure, as shown in FIGS. 4A-4B and FIG. 8A, there is provided a system 10, such as in the form of system 10a (see FIG. 4A) or such as in the form of system 10b (see FIG. 4B), to enable selective smoke detection sensitivity in the air vehicle 12, such as in the form of aircraft 12a. FIG. 4A is an illustration of a schematic diagram showing an embodiment of the system 10, such as in the form of system 10a, to enable selective smoke detection sensitivity. FIG. 4B is an illustration of a schematic diagram showing another embodiment of the system 10, such as in the form of system 10b, to enable selective smoke detection sensitivity. FIG. 8A is an illustration of a functional box diagram showing an embodiment of the system 10 of the disclosure.

As shown in FIGS. 4A-4B and FIG. 8A, the air vehicle 12, such as in the form of aircraft 12a, houses the system 10 (see FIG. 8A) to enable selective smoke detection sensitivity onboard the aircraft 12a. FIG. 4A shows in one embodiment, the system 10, such as in the form of system 10a, installed in the aircraft 12a, such as a commercial passenger aircraft.

As shown in FIG. 4A, the aircraft 12a, such as commercial passenger aircraft, comprises aircraft areas 74, which may be categorized into one or more compartment zone specific areas 128. As further shown in FIG. 4A, the aircraft areas 74, which may be categorized into one or more compartment zone specific areas 128, preferably comprise the cockpit 28, a cabin/passenger area 76a, an electrical equipment bay 78, a forward cargo bay 80, a wing box 82, an aft cargo bay 84, and a bulk cargo bay 86. The cabin/passenger area 76a (see FIG. 4A) may include one or more closet/stowage compartments 88 (see FIG. 4A), one or more lavatories 90 (see FIG. 4A), one or more crew rest compartments 92 (see FIG. 4A), and one or more galleys 94.

As shown in FIG. 4A, the cockpit 28 and the cabin/passenger area 74 are aircraft areas 74 located on an upper deck 66 of the aircraft 12a. The upper deck 66 is an occupied area of the aircraft 12a that, in general, is occupied by passengers and flight crew members.

As shown in FIG. 4A, the electrical equipment bay 78, the forward cargo bay 80, the wing box 82, the aft cargo bay 84, and the bulk cargo bay 86 are aircraft areas 74 located on a lower deck 68 of the aircraft 12a. The lower deck 68 is a non-occupied area of the aircraft 12a. For example, cargo 126 (see FIG. 4A) is shown stored in the aft cargo bay 84 (see FIG. 4A). However, cargo 126 (see FIG. 4A) may also be stored in other cargo areas of the aircraft 12a (see FIG. 4A).

FIG. 4B shows in another embodiment, the system 10, such as in the form of system 10b, installed in the aircraft 12a, such as a cargo aircraft. As shown in FIG. 4B, the aircraft 12a, such as cargo aircraft, comprises aircraft areas 74, which may be categorized into one or more compartment zone specific areas 128. As further shown in FIG. 4B, the aircraft areas 74, which may be categorized into one or more compartment zone specific areas 128, preferably comprise the cockpit 28, a main deck cargo bay 76b, the electrical equipment bay 78, the forward cargo bay 80, the wing box 82, the aft cargo bay 84, and the bulk cargo bay 86.

As shown in FIG. 4B, the cockpit 28 and the main deck cargo bay 76b are aircraft areas 74 located on the upper deck 66 of the aircraft 12a, and the electrical equipment bay 78, the forward cargo bay 80, the wing box 82, the aft cargo bay 84, and the bulk cargo bay 86 are aircraft areas 74 located on the lower deck 68 of the aircraft 12a. Cargo 126 (see FIG. 4B) is shown stored in the aft cargo bay 84 (see FIG. 4B). However, cargo 126 (see FIG. 4B) may also be stored in other cargo areas of the aircraft 12a (see FIG. 4B).

As shown in FIGS. 4A-4B and FIG. 8A, the system 10 comprises one or more sensitivity selectable smoke detector assemblies 70 installed onboard the aircraft 12a. In the embodiment of the system 10, such as in the form of system 10a, shown in FIG. 4A, the system 10 preferably comprises one or more sensitivity selectable smoke detector assemblies 70 located in the closet/stowage compartment 88, the lavatory 90, the crew rest compartment 92, and the galley 94 of the cabin/passenger area 76a. Further, in the embodiment of the system 10, such as in the form of system 10a, shown in FIG. 4A, the system 10 preferably comprises one or more sensitivity selectable smoke detector assemblies 70 located in the electrical equipment bay 78, the forward cargo bay 80, the wing box 82, the aft cargo bay 84, and the bulk cargo bay 86.

In the embodiment of the system 10, such as in the form of system 10b, shown in FIG. 4B, the system 10 preferably comprises one or more sensitivity selectable smoke detector assemblies 70 located in the main deck cargo bay 76b. Further, in the embodiment of the system 10, such as in the form of system 10b, shown in FIG. 4A, the system 10 preferably comprises one or more sensitivity selectable smoke detector assemblies 70 located in the electrical equipment bay 78, the forward cargo bay 80, the wing box 82, the aft cargo bay 84, and the bulk cargo bay 86.

As further shown in FIGS. 4A-4B, each of the one or more sensitivity selectable smoke detector assemblies 70 is preferably electrically or wirelessly coupled to one or more sensitivity selector control panels 72 installed onboard the aircraft 12a. In the embodiment of the system 10, such as in the form of system 10a, shown in FIG. 4A, the system 10 comprises two sensitivity selector control panels 72, including a first sensitivity selector control panel 72a located in the cockpit 28 and a second selector control panel 72b located in the cabin/passenger area 76a. In the embodiment of the system 10, such as in the form of system 10b, shown in FIG. 4B, the system 10 comprises one sensitivity selector control panel 72, including the first sensitivity selector control panel 72a, located in the cockpit 28.

As shown in FIGS. 4A-4B and FIG. 8A, each of the one or more sensitivity selectable smoke detector assemblies 70 installed onboard the aircraft 12a comprises a sensitivity selectable smoke detector device 71. The sensitivity selectable smoke detector device 71 may comprise devices such as an ionization-area type sensitivity selectable smoke detector device, a photoelectric-area type sensitivity selectable smoke detector device, a photoelectric (ducted or ambient) type sensitivity selectable smoke detector device, or another suitable sensitivity selectable smoke detector device 71.

The ionization-area type sensitivity selectable smoke detector device is designed to detect the presence of ionized particles created by the combustion process as they are convectively carried through, for example, the lavatories 90 (see FIG. 4A) or crew rest compartments 92 (see FIG. 4A) in the event of a fire. They may be mounted in the ceiling or upper sidewalls of the aircraft areas 74 (see FIG. 4A) where the sensitivity selectable smoke detector device 71 is located.

The photoelectric-area type sensitivity selectable smoke detector device is designed to detect the presence of smoke particles in the air by reflection of scattered light. They also rely on particles in the air being convectively carried into a sensing chamber where light from a pilot lamp is transmitted through a sensing chamber. If smoke is present, it will reflect light onto a photocell and trigger an alarm. Alternatively, photoelectric detectors based on an advanced smoke sensor utilizing two or more discrete wavelengths to determine the presence of smoke and to distinguish between smoke and nonsmoke aerosols may be used. These are also mounted in the ceiling or upper sidewalls of the aircraft areas 74 (see FIG. 4A) where the sensitivity selectable smoke detector device 71 is located.

The photoelectric-ducted type sensitivity selectable smoke detector device is similar to the photoelectric-area type sensitivity selectable smoke detector device, but it may be mounted behind the walls of the aircraft areas 74 (see FIG. 4A) where the sensitivity selectable smoke detector device 71 is located. They differ from the photoelectric-area type sensitivity selectable smoke detector devices in that fans draw air samples from the aircraft area 74 into a series of air sampling ports in the monument walls and ceiling, and then through an aluminum tube manifold to the detectors.

Further, each sensitivity selectable smoke detector assembly 70 (see FIGS. 4A-4B and FIG. 8A) comprises one or more sensors 132 (see FIG. 8A) electrically or wirelessly coupled to the sensitivity selectable smoke detector device 71 (see FIGS. 4A-4B and FIG. 8A), and a controller 134 (see FIG. 8A) coupled to the sensitivity selectable smoke detector device 71 (see FIGS. 4A-4B and FIG. 8A). The controller 134 (see FIG. 8A) preferably comprises a computer processor device 134a (see FIG. 8A).

Each sensitivity selectable smoke detector assembly 70 (see FIGS. 4A-4B and FIG. 8A) further comprises a system logic 136 (see FIG. 8A) coupled to the sensitivity selectable smoke detector device 71 (see FIGS. 4A-4B and FIG. 8A), or to the controller 134 (see FIG. 8A). The system logic 136 (see FIG. 8A) is preferably configured to autonomously vary in real time two or more alarm setpoint sensitivity levels 100 (see FIGS. 5B, 8A). The system logic 136 (see FIG. 8A) preferably comprises one or more of an algorithm 136a (see FIG. 8A), a software program 136b (see FIG. 8A), a firmware program 136c (see FIG. 8A), or another suitable system logic 136.

Each sensitivity selectable smoke detector assembly 70 (see FIGS. 4A-4B and FIG. 8A) further comprises one or more system inputs 138 (see FIG. 8A) measured by the one or more sensors 132 (see FIG. 8A) and input into the sensitivity selectable smoke detector device 71 (see FIGS. 4A-4B and FIG. 8A), or input into the controller 134 (see FIG. 8A), for processing by the system logic 136 (see FIG. 8A). Each sensitivity selectable smoke detector assembly 70 (see FIGS. 4A-4B and FIG. 8A) further comprises a system output 140 (see FIG. 8A) generated when the alarm setpoint sensitivity level 100 (see FIG. 8A) is triggered. The system output 140 (see FIG. 8A) preferably comprises an alarm signal 114 (see FIGS. 5B, 8A) generated when the alarm setpoint sensitivity level 100 (see FIG. 8A) is triggered.

Each sensitivity selectable smoke detector 70 (see FIGS. 4A-4B and FIG. 8A) may further comprise a safeguard assembly 150 (see FIG. 8A) coupled to the one or more sensitivity selectable smoke detector assemblies 70 (see FIGS. 4A-4B and FIG. 8A). The safeguard assembly 150 (see FIG. 8A) preferably comprises one or more of a software based safeguard assembly 150a (see FIG. 8A), such as a digital entry identifier, for example, a digital password or digital code; a physical based safeguard assembly 150b (see FIG. 8A) such as a lock and key hardware or another suitable physical based safeguard; a location based safeguard assembly 150c (see FIG. 8A), such as restricted use safeguards based on location; or another suitable safeguard assembly 150 (see FIG. 8A).

Figure 5A:
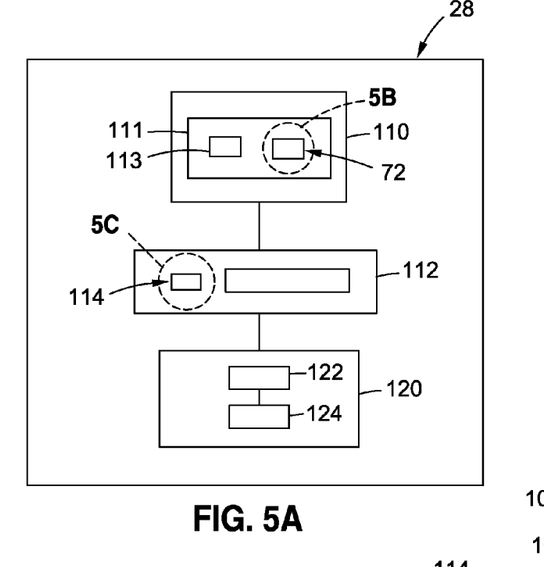
FIG. 5A is an illustration of a schematic diagram of a cockpit of an aircraft that incorporates a sensitivity selector control panel of the system of the disclosure.
Figure 5B:
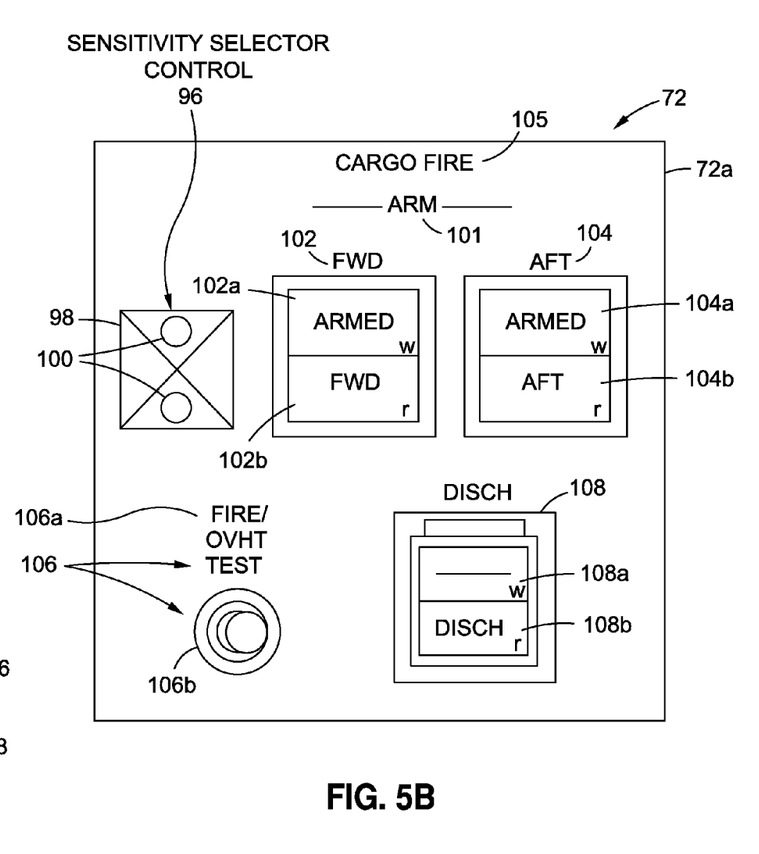
FIG. 5B is an illustration of an enlarged diagram of the sensitivity selector control panel of FIG. 5A showing a sensitivity selector control.

As shown in FIGS. 4A-4B, each sensitivity selector control panel 72 comprises a sensitivity selector control 96 (see also FIG. 5B). In one embodiment, the sensitivity selector control 96 (see FIGS. 4A-4B, 5B) comprises a master sensitivity selector control 96a (see FIG. 8A) to select and set an alarm setpoint sensitivity level 100 (see FIGS. 5B, 8A) for all of the one or more sensitivity selectable smoke detector assemblies 70 (see FIGS. 4A-4B, 8A) at one time. In another embodiment, the sensitivity selector control 96 (see FIGS. 4A-4B, 5B) comprises a selective sensitivity selector control 96b (see FIG. 8A) to select and set the alarm setpoint sensitivity level 100 (see FIGS. 5B, 8A) for one or more at a time of the one or more sensitivity selectable smoke detector assemblies 70 (see FIGS. 4A-4B, 8A). The sensitivity selector control 96 (see FIGS. 4A-4B, 5B) may be selected and activated via a smoke sensitivity selector control switch 98 (see FIG. 5B) located on or proximate to each of the one or more sensitivity selectable smoke detector assemblies 70 (see FIGS. 4A-4B).

FIG. 5A is an illustration of a schematic diagram of the cockpit 28 of the aircraft 12a (see FIG. 1) that incorporates the sensitivity selector control panel 72 (see also FIGS. 4A-4B) of the system 10. FIG. 5A shows the sensitivity selector control panel 72 installed at a first cockpit location 110 on an aircraft control display 111. The sensitivity selector control panel 72 (see FIG. 5A) may be positioned near other aircraft controls 113 (see FIG. 5A).

FIG. 5A further shows an alarm signal 114 installed at a second cockpit location 112. FIG. 5A further shows an engine-indicating and crew-alerting system 122 installed at a third cockpit location 120. The engine-indicating and crew-alerting system (EICAS) 122 (see FIG. 5A) is preferably coupled to one or more data processor units 124. The EICAS typically includes instrumentation of various engine parameters, including for example, revolutions per minute, temperature values, fuel flow and quantity, oil pressure, and other engine parameters. Aircraft systems that may be monitored by EICAS may include, for example, hydraulic, pneumatic, electrical, de-icing, environmental and control surface systems. The crew-alerting system (CAS) may be used in place of an annunciator panel. Rather than signaling a system failure by turning on a light behind a translucent button, failures are shown as a list of messages in a small window near the other EICAS indications.

FIG. 5B is an illustration of an enlarged diagram of the sensitivity selector control panel 72 of FIG. 5A showing the sensitivity selector control 96. FIG. 5B further shows the smoke sensitivity selector control switch 98 and the alarm setpoint sensitivity levels 100. As shown in FIG. 5B, the sensitivity selector control panel 72 may further comprise an ARM control 101 for a cargo fire indicator 105, a forward control 102 with an armed control of forward indicator 102a and a forward control of forward indicator 102b, and an aft control 104 with an armed control of aft indicator 104a and a forward control of forward indicator 104b.

The sensitivity selector control panel 72 (see FIG. 5B) further comprises a test switch assembly 106 (see FIG. 5B) comprising a fire/overheat test indicator 106a (see FIG. 5B) and a test switch 106b (see FIG. 5B). The test switch assembly 106 (see FIG. 5B) allows for the electrical and detector sensor integrity of the one or more sensors 132 (see FIG. 8A) and the system 10 (see FIG. 8A) to be checked by a flight crew member in the cockpit 28 (see FIG. 5B). Alternatively, the test switch assembly 106 may be located on or near each of the sensitivity selectable smoke detector assemblies 70 (see FIGS. 4A-4B and FIG. 8A) to allow a user, such as a flight crew member or a cargo loading crew member, to check the electrical and detector sensor integrity of the sensors 132 (see FIG. 8A) and the system 10 (see FIG. 8A) at any time.

The sensitivity selector control panel 72 (see FIG. 5B) further comprises a discharge control 108 (see FIG. 5B) with a no discharge control of discharge indicator 108a (see FIG. 5B) and a discharge control of discharge indicator 108b (see FIG. 5B).

Figure 5C:
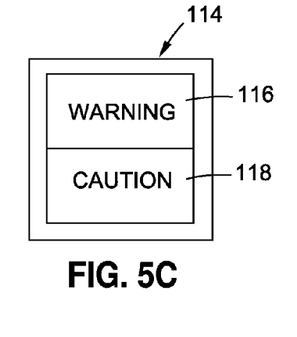
FIG. 5C is an illustration of an enlarged diagram of an alarm signal of the cockpit of FIG. 5A.

FIG. 5C is an illustration of an enlarged diagram of the alarm signal 114 of the cockpit 28 of FIG. 5A. The alarm signal 114 (see FIG. 5C) preferably includes a warning indicator 116 and a caution indicator 118.

FIG. 8A further shows system input 138 of sensitivity level determination factors 130. One or more of the sensitivity level determination factors 130 (see FIG. 8A) may be used to select and set the alarm setpoint sensitivity levels 100 (see FIG. 8A) for the sensitivity selectable smoke detector devices 71 (see FIG. 8A). The system 10 (see FIG. 8A) allows a user, such as a flight crew member or a cargo loading crew member to select one or more alarm setpoint sensitivity levels 100 (see FIG. 8A) ranging from a certified baseline setpoint to more sensitive setpoints.

As used herein, a "certified baseline setpoint" means a current certified baseline level set by the Federal Aviation Administration (FAA), which currently means the sensitivity selectable smoke detector assembly 70 and system 10 will alarm within one (1) minute of the start of a fire, including in the presence of smoke particles or other small airborne particles or other substances.

The one or more sensors 132 of the sensitivity selectable smoke detector assembly 70 (see FIG. 8A) may detect one of the sensitivity level determination factors 130 (see FIG. 8B), take one or more signal measurements, and send the signal measurements to the system logic 136 as system input 138 (see FIG. 8A). The system logic 136 may be in the controller 134 (see FIG. 8A) or in the sensitivity selectable smoke detector device 71 (see FIG. 8A), and the system logic 136 will take the system input 138 (see FIG. 8A) from the one or more sensors 132 (see FIG. 8A) and go through a series of decisions or a logic to decide whether or not to trigger an alarm signal 114 (see FIG. 5B). The alarm signal 114 (see FIG. 5B) is the system output 140 if the alarm is triggered.

Figure 8B:
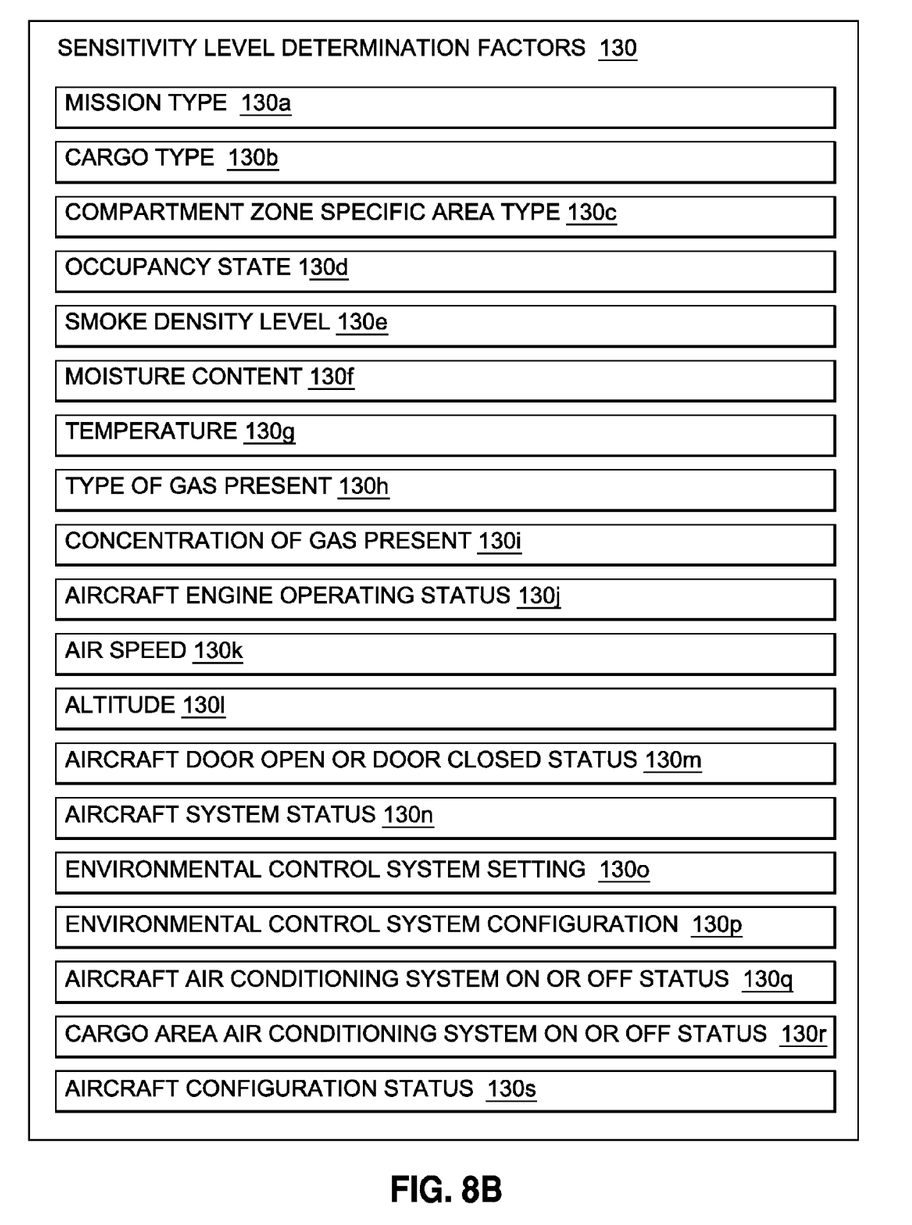
FIG. 8B is an illustration of a functional box diagram showing the sensitivity level determination factors used to determine the alarm setpoint sensitivity level of the system of the disclosure.

The decision or logic used to determine whether or not to trigger the alarm signal 114 (see FIG. 5B) is preferably based on using one or more sensitivity level determination factors 130 to determine the alarm setpoint sensitivity levels 100 (see FIG. 8A) of the system 10 (see FIG. 8A). FIG. 8B is an illustration of a functional box diagram showing the sensitivity level determination factors 130 used to determine the alarm setpoint sensitivity levels 100 (see FIG. 8A) of the system 10 (see FIG. 8A) of the disclosure. As shown in FIG. 8B, the sensitivity level determination factors 130 comprise one or more of, a mission type 130a of the aircraft 12a (see FIG. 1), a cargo type 130b on the aircraft 12a (see FIG. 1), a compartment zone specific area type 130c on the aircraft 12a (see FIG. 1), an occupancy state 130d on the aircraft 12a (see FIG. 1), a smoke density level 130e in an aircraft area 74 (see FIG. 8A), a moisture content 130f in the aircraft area 74 (see FIG. 8A), a temperature 130g of the aircraft area 74 (see FIG. 8A), a type of gas present 130h in the aircraft area 74 (see FIG. 8A), a concentration of gas present 130i in the aircraft area 74 (see FIG. 8A), an aircraft engine operating status 130j, an air speed 130k of the aircraft 12a (see FIG. 1), an altitude 130l of the aircraft 12a (see FIG. 1), an aircraft door open or door closed status 130m, an aircraft system status 130n, an environmental control system setting 103o on the aircraft 12a (see FIG. 1), an environmental control system configuration 130p (see on the aircraft 12a (see FIG. 1), an aircraft air conditioning system on or off status 130q, a cargo area air conditioning system on or off status 130r, an aircraft configuration status 130s, or another suitable sensitivity level determination factor 130.

As used herein, "environmental control system setting" means a setting of the environmental control system of the air vehicle 12 (see FIG. 1), such as aircraft 12a (see FIG. 1), where the setting preferably includes how much airflow the air conditioning system is putting out or moving, for example, in cubic feet per minute (cfm); how much airflow is flowing into the cabin/passenger area 76a (see FIG. 4A) or main deck cargo bay 76b (see FIG. 4B) versus the electrical equipment bay 78 (see FIGS. 4A-4B), the forward cargo bay 80 (see FIGS. 4A-4B), the wing box 82 (see FIGS. 4A-4B), the aft cargo bay 84 (see FIGS. 4A-4B), and the bulk cargo bay 86 (see FIGS. 4A-4B); a temperature of the airflow the air conditioning system is putting out or moving; whether air recirculation fans are on or off; and/or whether other types of fans are on or off for aircraft systems such as equipment cooling or another suitable aircraft system.

Figure 6:
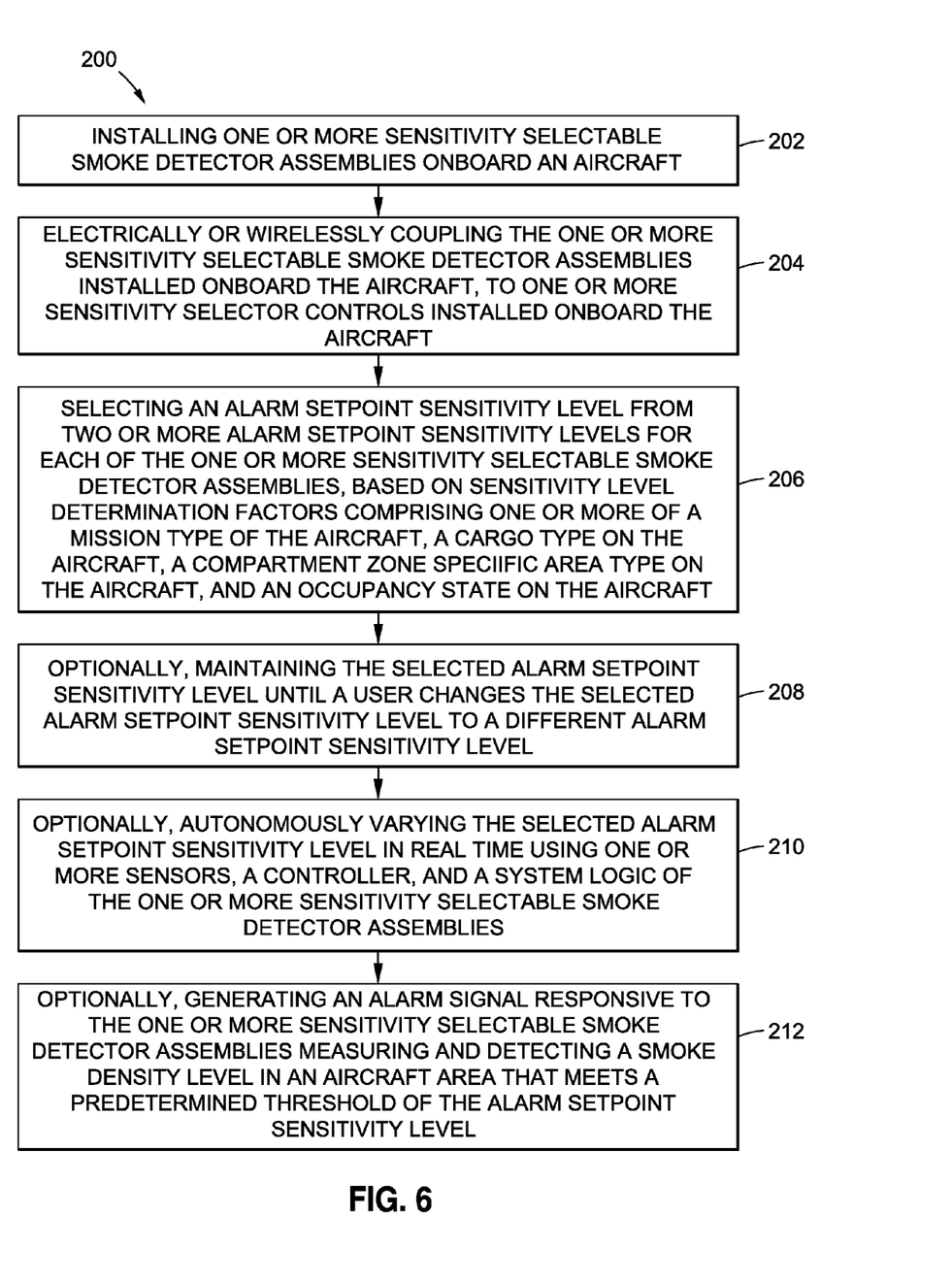
FIG. 6 is an illustration of a flow diagram showing an embodiment of a method of the disclosure.

In another embodiment, there is provided a method 200 (see FIG. 6) to enable selective smoke detection sensitivity onboard the aircraft 12a (see FIG. 1). FIG. 6 is an illustration of a flow diagram showing an embodiment of the method 200 of the disclosure. As shown in FIG. 6, the method 200 comprises step 202 of installing one or more sensitivity selectable smoke detector assemblies 70 (see FIGS. 4A-4B) onboard the aircraft 12a (see FIGS. 4A-4B).

As shown in FIG. 6, the method 200 further comprises step 204 of electrically or wirelessly coupling the one or more sensitivity selectable smoke detector assemblies 70 (see FIGS. 4A-4B) installed onboard the aircraft 12a (see FIG. 1) to one or more sensitivity selector controls 96 (see FIGS. 4A-4B) installed onboard the aircraft 12a (see FIGS. 4A-4B). The step 204 of electrically or wirelessly coupling the one or more sensitivity selectable smoke detector assemblies 70 (see FIGS. 4A-4B) may comprise electrically or wirelessly coupling the one or more sensitivity selectable smoke detector assemblies 70 (see FIGS. 4A-4B) to one or more sensitivity selector controls 96 (see FIG. 5B) comprising a smoke sensitivity selector control switch 98 (see FIG. 5B) located on or proximate to each of the one or more sensitivity selectable smoke detector assemblies 70 (see FIGS. 4A-4B).

The step 204 of electrically or wirelessly coupling the one or more sensitivity selectable smoke detector assemblies 70 (see FIGS. 4A-4B) may comprise electrically or wirelessly coupling the one or more sensitivity selectable smoke detector assemblies 70 (see FIGS. 4A-4B) to one or more sensitivity selector controls 96 (see FIG. 5B) comprising a smoke sensitivity selector control switch 98 (see FIG. 5B) located in one or more aircraft areas 74 (see FIGS. 4A-4B) in the aircraft 12a (see FIGS. 4A-4B). The one or more aircraft areas 74 (see FIGS. 4A-4B) preferably comprise the cockpit 28 (see FIGS. 4A-4B), the cabin/passenger area 76a (see FIG. 4A), the main deck cargo bay 76b (see FIG. 4B), the electrical equipment bay 78 (see FIGS. 4A-4B), the forward cargo bay 80 (see FIGS. 4A-4B), the wing box 82 (see FIGS. 4A-4B), the aft cargo bay 84 (see FIGS. 4A-4B), the bulk cargo bay 86 (see FIGS. 4A-4B), the closet/stowage compartment 88 (see FIG. 4A), the lavatory 90 (see FIG. 4A), the crew rest compartment 92 (see FIG. 4A), and the galley 94 (see FIG. 4A).

As shown in FIG. 6, the method 200 further comprises step 206 of selecting the alarm setpoint sensitivity level 100 (see FIG. 5B) from two or more alarm setpoint sensitivity levels 100 (see FIG. 5B) for each of the one or more sensitivity selectable smoke detector assemblies 70 (see FIGS. 4A-4B). The two or more alarm setpoint sensitivity levels 100 (see FIG. 5B) are preferably based on factors comprising one or more of a mission of the aircraft 12a (see FIGS. 1, 4A-4B), the cargo 126 (see FIGS. 4A-4B) on the aircraft 12a (see FIGS. 1, 4A-4B), and an occupancy state 130d (see FIG. 8B) of the aircraft 12a (see FIGS. 1, 4A-4B).

The step 206 of selecting the alarm setpoint sensitivity level 100 (see FIGS. 5B, 8A) further comprises, in one embodiment, using a master sensitivity selector control 96a (see FIG. 8A) to select and set the alarm setpoint sensitivity level 100 (see FIG. 8A) for all of the one or more sensitivity selectable smoke detector assemblies 70 (see FIG. 8A) at one time. The step 206 of selecting the alarm setpoint sensitivity level 100 (see FIGS. 5B, 8A) further comprises, in another embodiment, using a selective sensitivity selector control 96b (see FIG. 8A) to select and set the alarm setpoint sensitivity level 100 (see FIG. 8A) for one or more at a time of the one or more sensitivity selectable smoke detector assemblies 70 (see FIG. 8A).

The step 206 of selecting the alarm setpoint sensitivity level 100 (see FIG. 5B) may comprise selecting the alarm setpoint sensitivity level 100 (see FIG. 5B) remotely or proximate to each of the one or more sensitivity selectable smoke detector assemblies 70 (see FIGS. 4A-4B). The step 206 of selecting the alarm setpoint sensitivity level 100 (see FIG. 5B) may comprise selecting the alarm setpoint sensitivity level 100 (see FIG. 5B) based on an environmental control system setting 130o (see FIG. 8B).

As shown in FIG. 6, the method 200 further comprises optional step 208 of maintaining the selected alarm setpoint sensitivity level 100 (see FIG. 5B), until a user changes the selected alarm setpoint sensitivity level 100 (see FIG. 5B) to a different alarm setpoint sensitivity level 100 (see FIG. 5B).

As shown in FIG. 6, the method 200 further comprises optional step 210 of autonomously varying the selected alarm setpoint sensitivity level 100 (see FIG. 5B) in real time using one or more sensors 132 (see FIG. 8A), a controller 134 (see FIG. 8A), and a system logic 136 (see FIG. 8A) of the one or more sensitivity selectable smoke detector assemblies 70 (see FIGS. 4A-4B, 8A).

The method 200 (see FIG. 6) may further comprise optional step 212 of generating an alarm signal 114 (see FIG. 5C) responsive to the one or more sensitivity selectable smoke detector assemblies 70 (see FIGS. 4A-4B) measuring and detecting a smoke density level 130e (see FIG. 8B) that meets a predetermined threshold 142 (see FIG. 8A) of the alarm setpoint sensitivity level 100 (see FIG. 5B).

Figure 7:
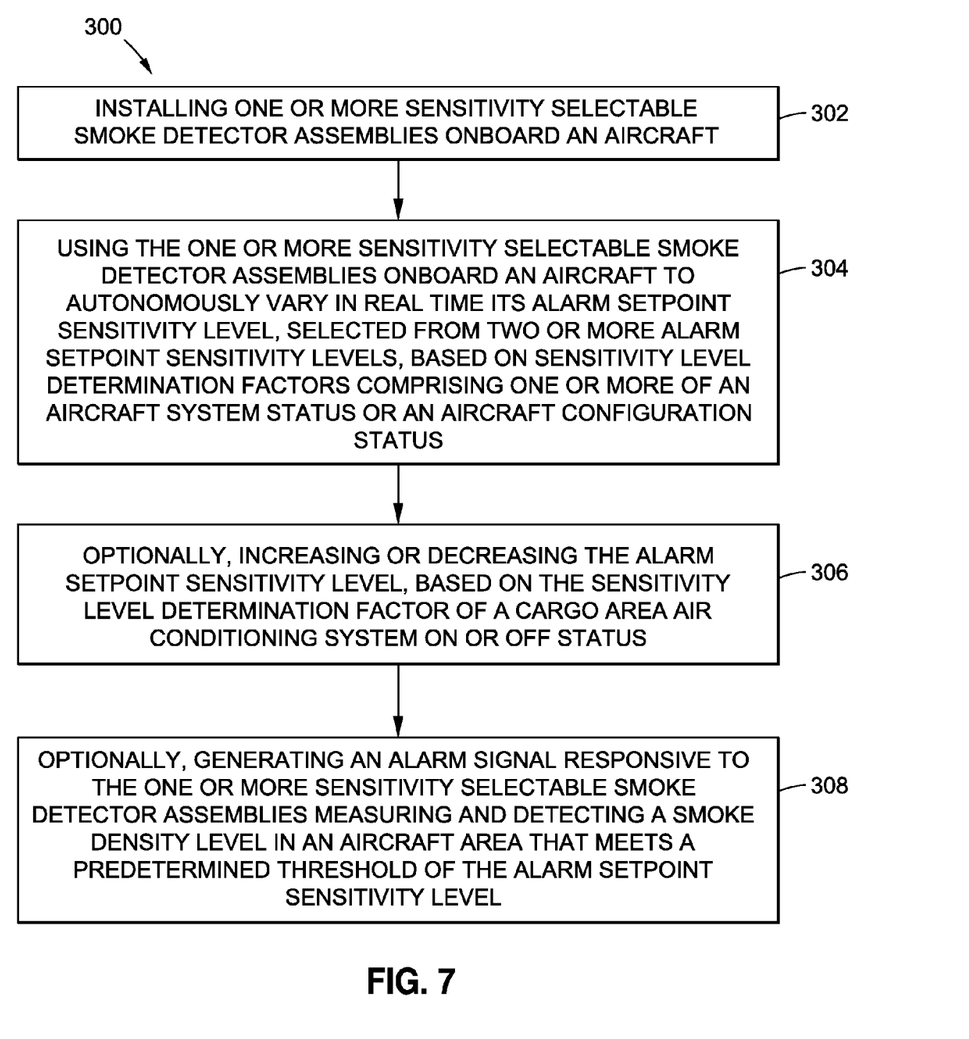
FIG. 7 is an illustration of a flow diagram showing another embodiment of a method of the disclosure.

In another embodiment, there is provided a method 300 (see FIG. 7) to enable selective smoke detection sensitivity onboard an aircraft 12a (see FIG. 1). FIG. 7 is an illustration of a flow diagram showing an embodiment of the method 300 of the disclosure.

As shown in FIG. 7, the method 300 comprises step 302 of installing one or more sensitivity selectable smoke detector assemblies 70 (see FIGS. 4A-4B) onboard the aircraft 12a (see FIG. 1). As shown in FIG. 7, the method 300 further comprises step 304 of using the one or more sensitivity selectable smoke detector assemblies 70 (see FIGS. 4A-4B) onboard the aircraft 12a (see FIG. 1) to autonomously vary in real time its alarm setpoint sensitivity level 100 (see FIG. 5B), selected from two or more alarm setpoint sensitivity levels 100 (see FIG. 5B), based on sensitivity level determination factors 130 (see FIGS. 8A-8B) comprising one or more of an aircraft system status 130n (see FIG. 8B) and an aircraft configuration status 130s (see FIG. 8B).

The step 304 of using the one or more sensitivity selectable smoke detector assemblies 70 (see FIGS. 4A-4B) comprises autonomously varying the selected alarm setpoint sensitivity level 100 (see FIG. 5B) in real time using one or more sensors 132 (see FIG. 8A), the controller 134 (see FIG. 8A), and the system logic 136 (see FIG. 8A) of the one or more sensitivity selectable smoke detector assemblies 70 (see FIGS. 4A-4B).

The step 304 of using the one or more sensitivity selectable smoke detector assemblies 70 (see FIGS. 4A-4B) further comprises autonomously varying the selected alarm setpoint sensitivity level 100 (see FIG. 5B) in real time, based on the sensitivity level determination factors 130 (see FIG. 8B) comprising one or more of the following: a mission type 130a (see FIG. 8B) of the aircraft 12a (see FIG. 1), a cargo type 130b (see FIG. 8B) on the aircraft 12a (see FIG. 1), a compartment zone specific area type 130c (see FIG. 8B) on the aircraft 12a (see FIG. 1), an occupancy state 130d (see FIG. 8B) on the aircraft 12a (see FIG. 1), a smoke density level 130e (see FIG. 8B) in an aircraft area 74 (see FIGS. 4A-4B, 8A), a moisture content 130f (see FIG. 8B) in the aircraft area 74 (see FIGS. 4A-4B, 8A), a temperature 130g (see FIG. 8B) of the aircraft area 74 (see FIGS. 4A-4B, 8A), a type of gas present 130h (see FIG. 8B) in the aircraft area 74 (see FIGS. 4A-4B, 8A), a concentration of gas present 130i (see FIG. 8B) in the aircraft area 74 (see FIGS. 4A-4B, 8A), an aircraft engine operating status 130j (see FIG. 8B), an air speed 130k (see FIG. 8B) of the aircraft 12a (see FIG. 1), an altitude 130l (see FIG. 8B) of the aircraft 12a (see FIG. 1), an aircraft door open or door closed status 130m (see FIG. 8B), an environmental control system setting 103o (see FIG. 8B) on the aircraft 12a (see FIG. 1), an environmental control system configuration 130p (see FIG. 8B) on the aircraft 12a (see FIG. 1), an aircraft air conditioning system on or off status 130q (see FIG. 8B).

As shown in FIG. 7, the method 300 further comprises optional step 306 of increasing or decreasing the alarm setpoint sensitivity level 100 (see FIG. 5B), based on the sensitivity level determination factor 130 (see FIGS. 8A-8B) of a cargo area air conditioning system on or off status 130r (see FIG. 8B).

As shown in FIG. 7, the method 300 further comprises optional step 308 of generating an alarm signal 114 (see FIG. 5C) responsive to the one or more sensitivity selectable smoke detector assemblies 70 (see FIGS. 4A-4B) measuring and detecting a smoke density level 130e (see FIG. 8B) in an aircraft area 74 (see FIG. 8A) that meets a predetermined threshold 142 (see FIG. 8A) of the alarm setpoint sensitivity level 100 (see FIG. 5B).

Disclosed embodiments of the system 10 (see FIGS. 4A-4B), the method 200 (see FIG. 6), and the method 300 (see FIG. 7) allow the flight crews or loading crews to select how sensitive the sensitivity selectable smoke detector assemblies 70 (see FIGS. 4A-4B) should be set. The least sensitive setting would be set at a current certified baseline setpoint. Moreover, the system 10 (see FIGS. 4A-4B), the method 200 (see FIG. 6), and the method 300 (see FIG. 7) allows flight crews and loading crews to select more sensitive settings based on risk of a false alarm versus the risk of fire situation. This may allow the flight crews and loading crews to select a higher sensitivity for the alarm setpoint sensitivity level 100 (see FIG. 5B) for the sensitivity selectable smoke detector assemblies 70 (see FIGS. 4A-4B), if the aircraft 12a (see FIGS. 4A-4B) is carrying batteries, such as lithium batteries, or other high threat/low false alarm causing cargo.

In addition, disclosed embodiments of the system 10 (see FIGS. 4A-4B), the method 200 (see FIG. 6), and the method 300 (see FIG. 7) provide for two or more alarm setpoint sensitivity levels 100 (see FIG. 5B) to be set in one embodiment by the flight crews or loading crews who take action to manually select the alarm setpoint sensitivity level 100 (see FIG. 8A) and when the sensitivity selectable smoke detector assembly 70 (see FIGS. 4A-4B, 8A) reaches the set alarm setpoint sensitivity level 100 (see FIG. 8A), the alarm signal 114 is triggered. Alternatively, in another embodiment, the system 10 (see FIGS. 4A-4B), the method 200 (see FIG. 6), and the method 300 (see FIG. 7) provide for two or more alarm setpoint sensitivity levels 100 (see FIG. 5B) to be set by using the one or more sensitivity selectable smoke detector assemblies 70 (see FIG. 8A) themselves to autonomously vary in real time their alarm setpoint sensitivity level 100 (see FIG. 8A), selected from two or more alarm setpoint sensitivity levels 100 (see FIG. 8A), based on various sensitivity level determination factors 130 (see FIG. 8B).

Further, disclosed embodiments of the system 10 (see FIGS. 4A-4B), the method 200 (see FIG. 6), and the method 300 (see FIG. 7) provide for the application of multiple sensitivity level setting smoke detector on aircraft, including commercial passenger aircraft and cargo aircraft, provide for protection against false alarms due to fumes created by fresh fruits or flowers as cargo, provide for one or more sensitivity selectable smoke detector assemblies 70 (see FIGS. 4A-4B, 8A) located in multiple compartment zone specific areas 128 (see FIGS. 4A-4B), and provide for the capability of changing the sensitivity settings, such as the alarm setpoint sensitivity levels 100 (see FIG. 5B), from one or more aircraft areas 74 (see FIGS. 4A-4B), including the cargo area, and the cockpit 28 (see FIGS. 4A-4B) or flight deck. In addition, disclosed embodiments of the system 10 (see FIGS. 4A-4B), the method 200 (see FIG. 6), and the method 300 (see FIG. 7) are designed to provide early warning of smoke or fire, which in turn, will provide more time to get the flight crew and/or passengers on the ground safely.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method to enable selective smoke detection sensitivity onboard an aircraft, the method comprising the steps of:
   installing a plurality of sensitivity selectable smoke detector assemblies onboard the aircraft;
   electrically or wirelessly coupling the plurality of sensitivity selectable smoke detector assemblies installed onboard the aircraft, to one or more sensitivity selector controls installed onboard the aircraft; and
   selecting an alarm setpoint sensitivity level from two or more alarm setpoint sensitivity levels for each of the plurality of sensitivity selectable smoke detector assemblies, based on sensitivity level determination factors comprising one or more of a mission type of the aircraft, a cargo type on the aircraft, a compartment zone specific area type on the aircraft, and an occupancy state on the aircraft, and selecting the alarm setpoint sensitivity level based on the sensitivity level determination factor of an environmental control system setting of the aircraft, including quantity and temperature of airflow from an air conditioning system of the aircraft, quantity of airflow flowing into a cabin area or a main deck cargo bay area of the aircraft, and air recirculation fans being on or off.

2. The method of claim 1, further comprising the step of maintaining the selected alarm setpoint sensitivity level until a user changes the selected alarm setpoint sensitivity level to a different alarm setpoint sensitivity level.

3. The method of claim 1, further comprising the step of autonomously varying the selected alarm setpoint sensitivity level in real time using one or more sensors, a controller, and a system logic of the plurality of sensitivity selectable smoke detector assemblies.

4. The method of claim 1, further comprising the step of generating an alarm signal responsive to the plurality of sensitivity selectable smoke detector assemblies measuring and detecting a smoke density level in an aircraft area that meets a predetermined threshold of the alarm setpoint sensitivity level.

5. The method of claim 1, wherein the step of electrically or wirelessly coupling the plurality of sensitivity selectable smoke detector assemblies comprises electrically or wirelessly coupling the plurality of sensitivity selectable smoke detector assemblies to one or more sensitivity selector controls comprising a smoke sensitivity selector control switch located on or proximate to each of the plurality of sensitivity selectable smoke detector assemblies.

6. The method of claim 1, wherein the step of electrically or wirelessly coupling the plurality of sensitivity selectable smoke detector assemblies comprises electrically or wirelessly coupling the plurality of sensitivity selectable smoke detector assemblies to one or more sensitivity selector controls comprising a smoke sensitivity selector control switch located in one or more aircraft areas comprising a cockpit, a cabin/passenger area, a main deck cargo bay, an electrical equipment bay, a forward cargo bay, a wing box, an aft cargo bay, a bulk cargo bay, a closet, a stowage compartment, a lavatory, a crew rest compartment, and a galley.

7. The method of claim 1, wherein the step of selecting the alarm setpoint sensitivity level comprises selecting the alarm setpoint sensitivity level remotely or proximate to each of the plurality of sensitivity selectable smoke detector assemblies.

8. The method of claim 1, wherein the step of selecting the alarm setpoint sensitivity level comprises using one of, a master sensitivity selector control to select and set the alarm setpoint sensitivity level for all of the plurality of sensitivity selectable smoke detector assemblies at one time, and a selective sensitivity selector control to select and set the alarm setpoint sensitivity level for one or more at a time of the plurality of sensitivity selectable smoke detector assemblies.

9. The method of claim 1, wherein the step of selecting the alarm setpoint sensitivity level further comprises selecting the alarm setpoint sensitivity level based on the sensitivity level determination factor of the environmental control system setting including a cargo area air conditioning system on or off status.

10. A method to enable selective smoke detection sensitivity onboard an aircraft, the method comprising the steps of:
   installing a plurality of sensitivity selectable smoke detector assemblies onboard the aircraft, each sensitivity selectable smoke detector assembly comprising:
      a sensitivity selectable smoke detector device;
      one or more sensors electrically or wirelessly coupled to the sensitivity selectable smoke detector device;
      a controller coupled to the sensitivity selectable smoke detector device;
      a system logic coupled to the sensitivity selectable smoke detector device or to the controller;
      one or more system inputs measured by the one or more sensors and input into each sensitivity selectable smoke detector device, or input into the controller, for processing by the system logic; and
      a system output generated when the alarm setpoint sensitivity level is triggered;
   using the one or more sensors, the controller, and the system logic of the plurality of sensitivity selectable smoke detector assemblies onboard the aircraft to autonomously vary in real time its alarm setpoint sensitivity level, selected from two or more alarm setpoint sensitivity levels, based on sensitivity level determination factors comprising one or more of an aircraft system status and an aircraft configuration status; and selecting the alarm setpoint sensitivity level based on the sensitivity level determination factor of an environmental control system setting of the aircraft, including quantity and temperature of airflow from an air conditioning system of the aircraft, quantity of airflow flowing into a cabin area or a main deck cargo bay area of the aircraft, and air recirculation fans being on or off.

11. The method of claim 10, wherein the step of selecting the alarm setpoint sensitivity level further comprises selecting the alarm setpoint sensitivity level based on the sensitivity level determination factor of the environmental control system setting including a cargo area air conditioning system on or off status.

12. The method of claim 10, further comprising the step of generating an alarm signal responsive to the plurality of sensitivity selectable smoke detector assemblies measuring and detecting a smoke density level in an aircraft area that meets a predetermined threshold of the alarm setpoint sensitivity level.

13. The method of claim 10, wherein the step of installing the plurality of sensitivity selectable smoke detector assemblies comprises installing the plurality of sensitivity selectable smoke detector assemblies, each sensitivity selectable smoke detector assembly further comprising a safeguard assembly comprising one or more of a software based safeguard assembly, a physical based safeguard assembly, and a location based safeguard assembly.

14. The method of claim 10, wherein the step of using the plurality of sensitivity selectable smoke detector assemblies comprises autonomously varying the selected alarm setpoint sensitivity level in real time, based on the sensitivity level determination factors comprising one or more of, a mission type of the aircraft, a cargo type on the aircraft, a compartment zone specific area type on the aircraft, an occupancy state on the aircraft, a smoke density level in an aircraft area, a moisture content in the aircraft area, a temperature of the aircraft area, a type of gas present in the aircraft area, a concentration of gas present in the aircraft area, an aircraft engine operating status, an air speed of the aircraft, an altitude of the aircraft, an aircraft door open or door closed status, an environmental control system setting on the aircraft, an environmental control system configuration on the aircraft, and an aircraft air conditioning system on or off status.

15. A system to enable selective smoke detection sensitivity onboard an aircraft, the system comprising:
a plurality of sensitivity selectable smoke detector assemblies installed onboard the aircraft, each sensitivity selectable smoke detector assembly comprising:
a sensitivity selectable smoke detector device;
one or more sensors electrically or wirelessly coupled to the sensitivity selectable smoke detector device;
a controller coupled to the sensitivity selectable smoke detector device;
a system logic coupled to the sensitivity selectable smoke detector device or to the controller, the system logic configured to autonomously vary in real time two or more alarm setpoint sensitivity levels, based on sensitivity level determination factors comprising one or more of an aircraft system status and an aircraft configuration status, and further based on the sensitivity level determination factor of an environmental control system setting of the aircraft, including quantity and temperature of airflow from an air conditioning system of the aircraft, quantity of airflow flowing into a cabin area or a main deck cargo bay area of the aircraft, and air recirculation fans being on or off;
one or more system inputs measured by the one or more sensors and input into each sensitivity selectable smoke detector device, or input into the controller, for processing by the system logic; and
a system output generated when the alarm setpoint sensitivity level is triggered.

16. The system of claim 15, further comprising a safeguard assembly coupled to the plurality of sensitivity selectable smoke detector assemblies, the safeguard assembly comprising one or more of a software based safeguard assembly, a physical based safeguard assembly, and a location based safeguard assembly.

17. The system of claim 15, wherein the controller comprises a computer processor device.

18. The system of claim 15, wherein the system logic comprises one or more of an algorithm, a software program, and a firmware program.

19. The system of claim 15, wherein the sensitivity level determination factors further comprise one or more of, a mission type of the aircraft, a cargo type on the aircraft, a compartment zone specific area type on the aircraft, an occupancy state on the aircraft, a smoke density level in an aircraft area, a moisture content in the aircraft area, a temperature of the aircraft area, a type of gas present in the aircraft area, a concentration of gas present in the aircraft area, an aircraft engine operating status, an air speed of the aircraft, an altitude of the aircraft, an aircraft door open or door closed status, an environmental control system configuration on the aircraft, an aircraft air conditioning system on or off status, and a cargo area air conditioning system on or off status.

20. The system of claim 15, wherein the system output comprises an alarm signal generated when the alarm setpoint sensitivity level is triggered.

* * * * *